United States Patent [19]
Weaver et al.

[11] Patent Number: 5,826,888
[45] Date of Patent: Oct. 27, 1998

[54] QUICK RELEASE CHUCK DEVICE

[75] Inventors: Mark V. Weaver, Clemson; Mark S. Hart, Central, both of S.C.

[73] Assignee: Power Tool Holders Incorporated, Wilmington, Del.

[21] Appl. No.: 740,098

[22] Filed: Oct. 24, 1996

[51] Int. Cl.⁶ .................................................. B23B 31/117
[52] U.S. Cl. ........................ 279/23.1; 279/46.2; 279/54; 279/140; 279/904; 403/229
[58] Field of Search ..................... 279/9.1, 23.1, 279/46.1, 46.2, 102, 140, 904, 54; 403/229; 464/40, 57

[56] References Cited

U.S. PATENT DOCUMENTS

| | | | |
|---|---|---|---|
| 414,078 | 10/1889 | Rehfuss et al. | 279/46.4 |
| 1,642,490 | 9/1927 | Decker et al. | |
| 2,105,330 | 1/1938 | Pagenkopf | 279/23.1 |
| 2,559,895 | 7/1951 | Norlander | 279/23.1 |
| 3,437,059 | 4/1969 | Stonier et al. | 403/229 |
| 3,521,895 | 7/1970 | Smith | 279/22 |
| 3,794,335 | 2/1974 | Thackston et al. | 279/23.1 |
| 4,385,854 | 5/1983 | Miyakawa | 408/127 |
| 4,582,332 | 4/1986 | Sekino et al. | 279/23.1 |
| 5,174,588 | 12/1992 | Reibetanz et al. | 279/140 |
| 5,466,106 | 11/1995 | Bone et al. | 411/433 |

*Primary Examiner*—Steven C. Bishop
*Attorney, Agent, or Firm*—Dority & Manning

[57] ABSTRACT

A quick release chuck device includes a body member and a device for attaching the body member to a drive spindle. A longitudinal bore or recess is defined in the body member and a resilient coiled member gripping device is disposed in the longitudinal recess. The coiled member defines an inner diameter bore for receipt of a tool shank inserted therein. A device is provided for variably coiling the coiled member gripping device within the longitudinal recess thereby causing the inner diameter bore to constrict and grip upon a tool shank inserted therein.

13 Claims, 8 Drawing Sheets

QUICK RELEASE CHUCK DEVICE

BACKGROUND OF THE INVENTION

The present invention relates to a chuck device for holding a tool bit to a drive spindle of a machine tool, and more particularly to a quick release chuck device particularly suited for high speed applications, such as with a router.

Various devices are known in the art for use on routers, laminate trimmers, dry wall cutters, etc., for securing or holding tools or bits to a drive spindle of the machine tool. For example, various tool holding devices and quick release adaptors are known in the art. U.S. Pat. No. 5,301,961 to Wozar describes such a chuck device. Likewise, U.S. Pat. No. 4,692,073 to Martindell describes a chuck apparatus for power bits utilizing a spring-biased sleeve disposed about the drive spindle for axially securing the power bit to the chuck apparatus.

It is desirable for portable tools, such as routers or laminate trimmers, to utilize quick release chuck devices for relatively quick and easy change out of tool bits, including tool bits having round shank portions. Integrated collet and chuck devices, such as the device described in U.S. Pat. 5,511,801 to Kanaan, et al., have proven to be an improvement in the art in that they allow for quick and easy change out of the tool bit while utilizing the benefits of a collet gripping device.

The present invention relates to an improved quick release chuck device for holding tool bits having round shanks to a drive spindle of a machine tool.

OBJECTS AND SUMMARY OF THE INVENTION

It is therefore a principal object of the present invention to provide an improved quick release chuck device for securing a tool bit or working device to a drive spindle of a machine tool.

A further object of the present invention is to provide a versatile quick change chuck device which is capable of holding tool bits having round tool shanks.

And yet a further object of the present invention is to provide a fast acting quick release chuck device capable of holding tool bits of varying shank diameters.

Additional objects and advantages of the invention will be set forth in part in the description which follows, and in part will be obvious from the description, or may be learned through practice of the invention. The objects and advantages of the invention may be realized and obtained by means of the instrumentalities and combinations particularly pointed out in the appended claims.

To achieve the objects and in accordance with the purposes of the invention, a quick change chuck device is provided comprising a body member having a longitudinal recess defined therein for receipt of a shank of a tool bit to be held by the chuck device. A sleeve member is rotatably mounted on the body member and has a longitudinal passage axially aligned with the longitudinal recess of the body member. A resilient coiled member, such as a torsion or expansion spring, is seated in the longitudinal recess defined in the body member. One end of the spring is connected to the body member while the other end of the spring is connected to the rotatable sleeve member. In one preferred embodiment of the invention, the ends of the spring are threaded on their outer circumferential surface and are threadedly connected with the body member and sleeve member respectively.

The resilient coiled member defines an inner diameter bore through which the tool shank is inserted. The sleeve member can be manually grasped and rotated relative to the body member in opposition to the force of the coiled resilient member. As the sleeve is rotated, the coils of the coiled member tighten or constrict and thereby reduce the size of the inner diameter bore causing the coils to grip on the tool shank inserted in the bore.

A rotational position releasable locking mechanism is configured relative to the body member and the sleeve member to releasably lock the sleeve member in its rotated position once the coils have been sufficiently tightened onto the tool shank. In a preferred embodiment of the invention, the releasable locking mechanism includes a ratcheting device. The ratcheting device may include a spring loaded collar having a toothed ratchet face which interfaces with an opposite toothed face defined on the rotatable sleeve member.

In order to prevent excessive or over torquing and damage to the coiled member when a tool shank is not inserted into the chuck device, a blank member is spring loaded within the body member and is movable axially within the body member upon insertion of the tool shank. The blank member insures that the space of the operative gripping section of the coiled member is always occupied, thus preventing over torquing of the coiled member. In other words, the gripping section of the coiled member is always occupied by the blank member, a tool shank, or both the blank member and tool shank.

In an alternative embodiment, the coiled member is releasably engaged in the body member so as to be freely rotatable in the body member when a tool shank is not inserted into the device. In this manner, the sleeve member can be freely rotated without the danger of over torquing the coiled member. Once a tool shank is inserted into the device, an insert attached to the end of the coiled member engages with the body member, for example, through a ball and detent device engaging with splines defined in the body member, so as to rotationally lock the coiled member relative to the body member. The sleeve member is then rotated relative to the body member to actuate the coiled member gripping device.

The coiled member gripping device operates on the principal of variably torquing or coiling the member which causes the coils to tighten or constrict. A countless number of mechanisms or devices could be utilized in the invention to apply a releasable coiling force to the coiled member. The rotatable sleeve described in the present specification is merely an example of one suitable mechanism.

BRIEF DESCRIPTION OF THE DRAWINGS

FIG. 8b is a sectional view of the device taken along the lines indicated in FIG. 8a.

DESCRIPTION OF THE PREFERRED EMBODIMENTS

Reference will now be made in detail to the presently preferred embodiments of the invention, one or more example of which are illustrated in the accompanying drawings. Each example is provided by way of explanation of the invention, not limitation of the invention. It will be apparent to those skilled in the art that various modifications and variations can be made in the present invention without departing from the scope or spirit of the invention. For instance, features illustrated or described as part of one embodiment can be used in another embodiment to yield a still further embodiment. Thus, it is intended that the present invention covers such modifications and variations as come within the scope of the appended claims and their equivalents. The numbering of components in the drawings is consistent through the application, with the same components having the same number in each of the drawings.

Figure 7:
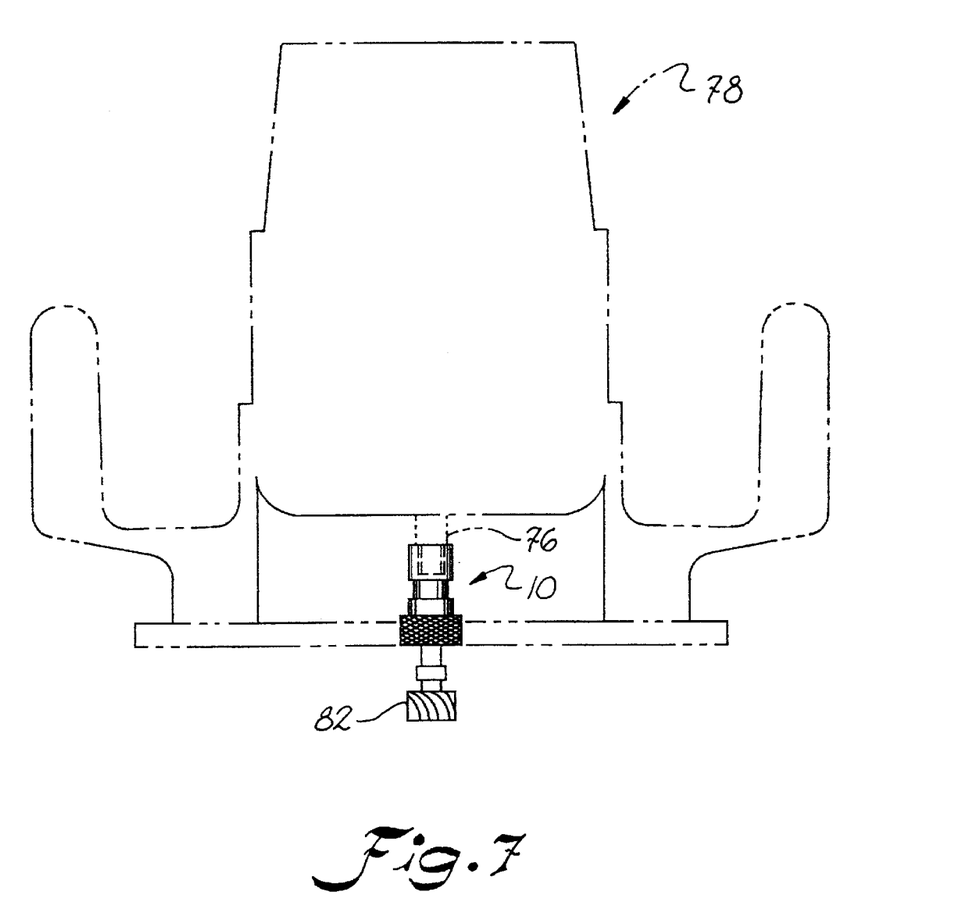
FIG. 7 is an environmental view of one application of the present chuck device.

The present inventive chuck device has uses in any application wherein it is desired to hold a tool or bit to the drive spindle of a machine tool, and any and all such uses are contemplated within the scope and spirit of the invention. The present chuck device is particularly useful in high speed applications requiring a relatively great degree of accuracy. For example, referring to FIG. 7, chuck device 10 is illustrated configured with a conventional router 78 indicated in diagrammatic form. Chuck device 10 is connected to drive spindle 76 of the router and is used to hold a tool bit 82 to the drive spindle. It should be understood, however, that the present invention is not limited to routers, laminate trimmers, dry wall cutters, and the like, but can be used in any number of applications wherein a chuck device is needed.

Figure 1:
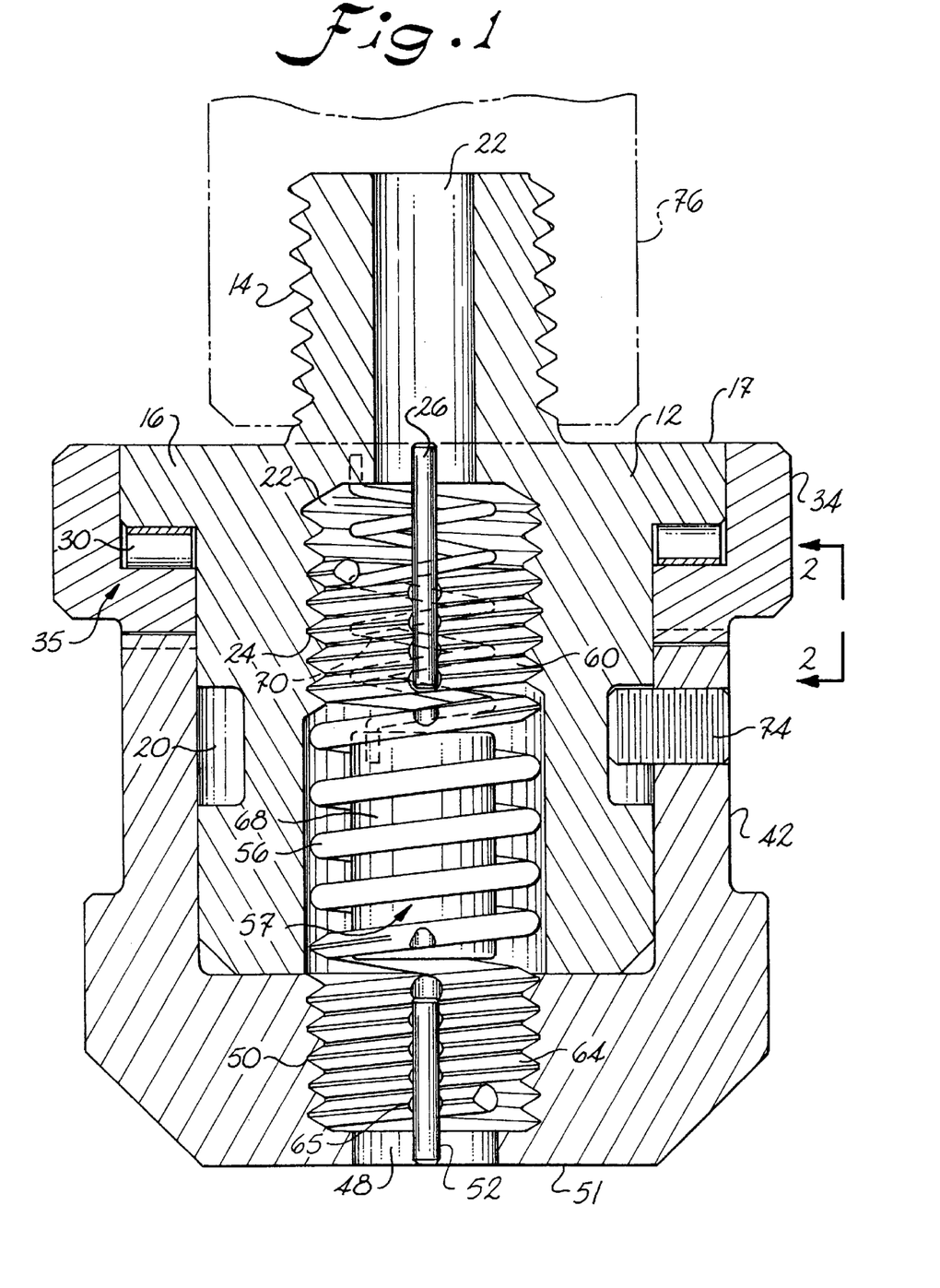
FIG. 1 is a cross-cut perspective view of the quick change chuck device according to the invention.
Figure 6:
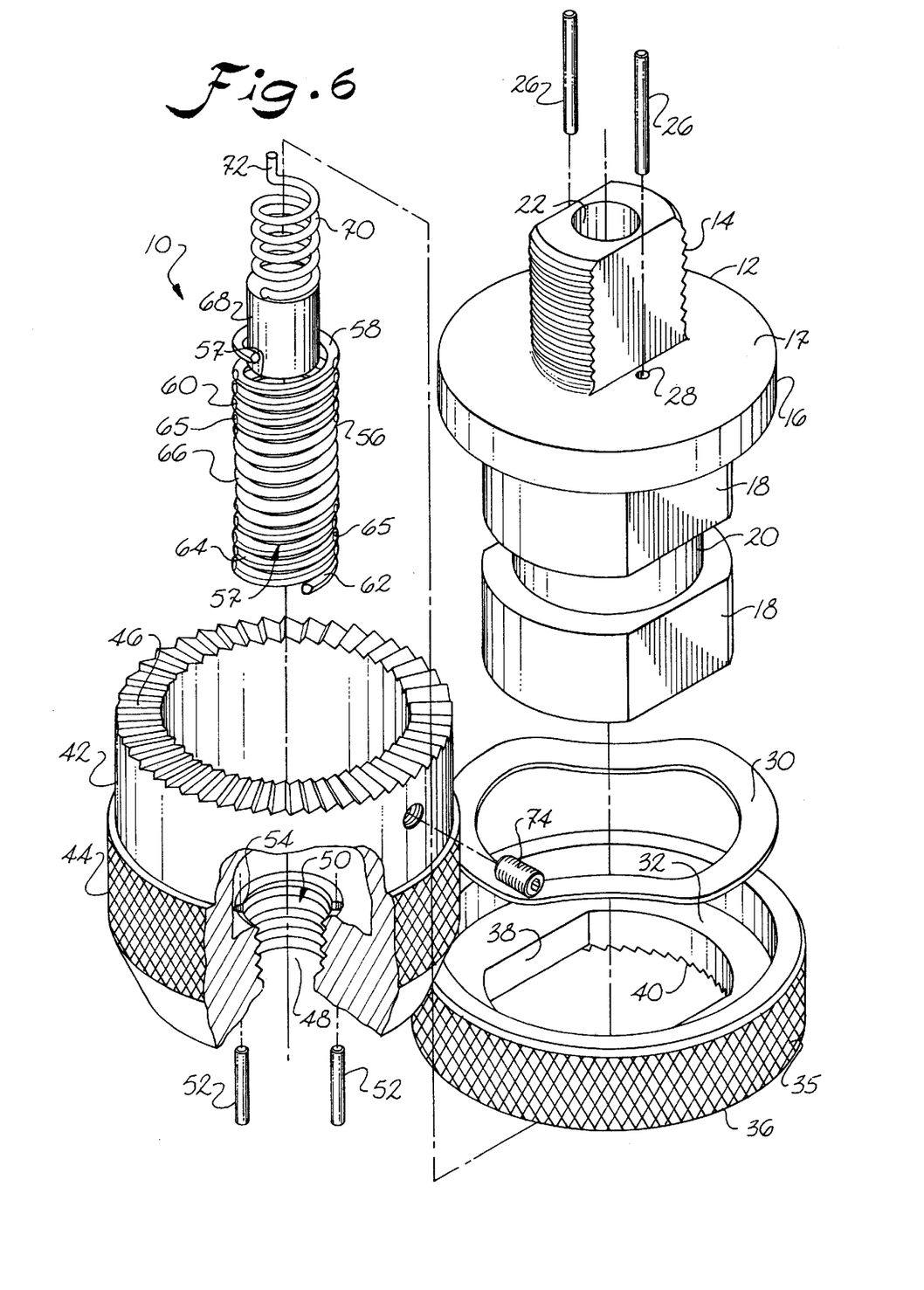
FIG. 6 is an in-line component view of the device illustrated in FIG. 1.

Referring to FIGS. 1 and 6 in particular, chuck device 10 includes a body member 12 which is configured to be attached to a drive spindle 76 of a driving tool. In the embodiment illustrated, body member 12 includes a threaded stem portion 14 which threadedly engages in a threaded receiving section defined in drive spindle 76, as is particularly illustrated in FIG. 1. It should be understood, however, that any number of conventional and well known mounting means can be utilized to mount body member 12 to the drive spindle. For example, set screws, mechanical locking devices, ball and detent mechanisms, screws, and any number of locking mechanisms are within the scope and spirit of the invention.

Body member 12 includes a flange section or member 16 which defines an end face or surface 17 of body member 12. Body member 12 includes flats 18 defined thereon. As will be explained later, flats 18 serve as rotational locking devices for collar 34. Body member 12 also includes an annular groove or recess 20 defined in the outer circumferential surface thereof. As particularly seen in FIG. 1, annular groove 20 has a longitudinal length greater than the diameter of set screw 74 which is utilized to hold sleeve member 42 relative to body member 12, as will be discussed in greater detail below.

Body member 12 also includes a longitudinal recess or bore 22 defined therein. In the embodiment illustrated in FIG. 1, recess 22 extends completely through body member 12 and has a reduced diameter section in the threaded stem portion 14. Bore 22 has a greater diameter portion in the central part of body member 12, as particularly seen in FIG. 1. It is not necessary that longitudinal recess 22 extend completely through body member 12, but may do so for machining purposes of the component.

Longitudinal bore or recess 22 defined in body member 12 contains a threaded portion or section 24, as particularly shown in FIG. 1.

Device 10 also includes a sleeve member 42 rotatably mounted on body member 12. Set screw 74 extends through sleeve member 42 and into annular groove 20 defined in body member 12. As can be particularly seen in FIG. 1, annular groove 20 has an overall width greater than the diameter of screw 74. Thus, it should be understood that sleeve member 42 is also moveable in an axial direction relative to body member 12 to the extent allowed by the width of annular groove 20. Sleeve member 42 can be formed of any conventional material and includes a grip enhancing surface 44 defined thereon, such as the knurled surface seen in FIG. 6.

Sleeve member 42 includes a longitudinal passage or bore 48 defined through the top face 51 thereof. Passage 48 is axially aligned with recess 22 defined in body member 12. Passage 48 also includes a threaded section 50 defined therein.

Device 10 also includes a resilient coiled member 56, as particularly seen in FIG. 6. Coiled member 56 can comprise a torsion or expansion spring, or similar device. Coiled member 56 includes a first end 58 with at least a portion of the coils adjacent the first end 58 having threads 60 defined on the outer circumference thereof. Likewise, coiled member 58 includes an opposite end 62 having threads 64 defined on the outer circumference of the coils adjacent end 62. A gripping section of coiled member 56 is defined between the threaded sections 60 and 64. The coils 66 in this gripping section are pulled or spaced apart in the "rest" or untorqued configuration of member 56.

Coiled member 56 defines an inner diameter bore 57 for receipt of a tool shank 82. Coiled member 56 is inserted into body member 12 and the threaded section 60 is threadedly engaged with the threaded section 24 of recess 22. Once member 56 has been threadedly engaged in recess 22, pins 26 are placed through holes 28 defined in flange member 16. Pins 26 rest in longitudinal grooves 65 defined in threaded section 60 of coiled member 56 and in oppositely facing grooves (not shown) defined in threaded section 24 of body member 12. Thus, it should be understood that pins 26 prevent unthreading of coiled member 56 from body member 12 after it has been inserted.

Sleeve member 42 is placed over body member 12 and the threaded section 50 of longitudinal passage 48 is threaded onto threaded section 64 of coiled member 56. Pins 52 are then placed through holes defined in end face 51 and reside in grooves 65 defined in threaded section 64 and oppositely facing grooves (not shown) defined in sleeve member 42. As with pins 26, pins 52 prevent unthreading of coiled member 56 from sleeve member 42.

It should be understood that the threaded connections between coiled member 56 and body member 12 and sleeve member 42 respectively are but one preferred embodiment for fixing coiled member 56 relative to the two components. Any other number of systems or devices may be utilized to fix or locate coiled member 56 relative to body member 12 and sleeve member 42. For example, coiled member 56 may comprise tabs or other interlocking mechanisms which engage in corresponding locking mechanisms defined in body member 12 and sleeve 42. All that is necessary is that coiled member 56 be non-rotatably secured to the components with little or no radial or axial play. It is well within the skill of those in this art to configure any number of suitable mechanisms to achieve this purpose.

Figure 2:
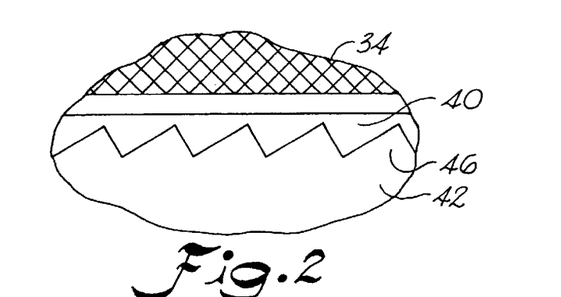
FIG. 2 is an enlarged sectional view showing the ratcheting interface between the collar section and sleeve member.

Device 10 also includes a rotational position releasable locking mechanism, generally 35, operably disposed between sleeve member 42 and body member 12. Releasable locking mechanism 35 can include any conventional locking mechanism, such as a ball and detent device, locking ring, or any other number of well known devices. In the embodiment illustrated, locking mechanism 35 includes a ratcheting device. Sleeve member 42 has a toothed ratchet face 46 defined on an end thereof, as particularly seen in FIG. 6. A collar 34 is mounted on body member 12 and includes an oppositely facing toothed ratchet surface 40, as particularly seen in FIGS. 2 and 6. A spring mechanism such as spring washer 30, is disposed between collar 34 and flange member 16 of body member 12. Spring washer 30 rests on face 32. Collar 34 also includes flats 38 defined on the inner diameter thereof as particularly seen in FIG. 6. Flats 38 align with flats 18 defined on body member 12 so that collar member 34 is rotationally fixed relative to body member 12. Collar 34 is, however, axially moveable relative to body member 12 by the action of spring 30. Thus, the ratcheting interface between faces 40 and 46 is released by the operator pulling back on collar 34 against the force spring washer 30. In this regard, collar 34 includes a grip enhancing surface 36 defined on the outer circumference thereof.

To prevent over torquing and damage to coiled member 56, device 10 includes a blank member 68 spring loaded within the inner diameter bore 57 of coiled member 56. Referring particularly to FIG. 1, it can be seen that blank member 68 is spring loaded within bore 57 by means of spring 70. When a tool is not inserted into device 10, blank member 68 occupies inner diameter bore 57 in the gripping range of coiled member 56. In this manner, if sleeve member 42 is inadvertently rotated prior to insertion of a tool shank into the device, coils 60 in the gripping range will constrict and grip onto blank member 68.

Figure 3:
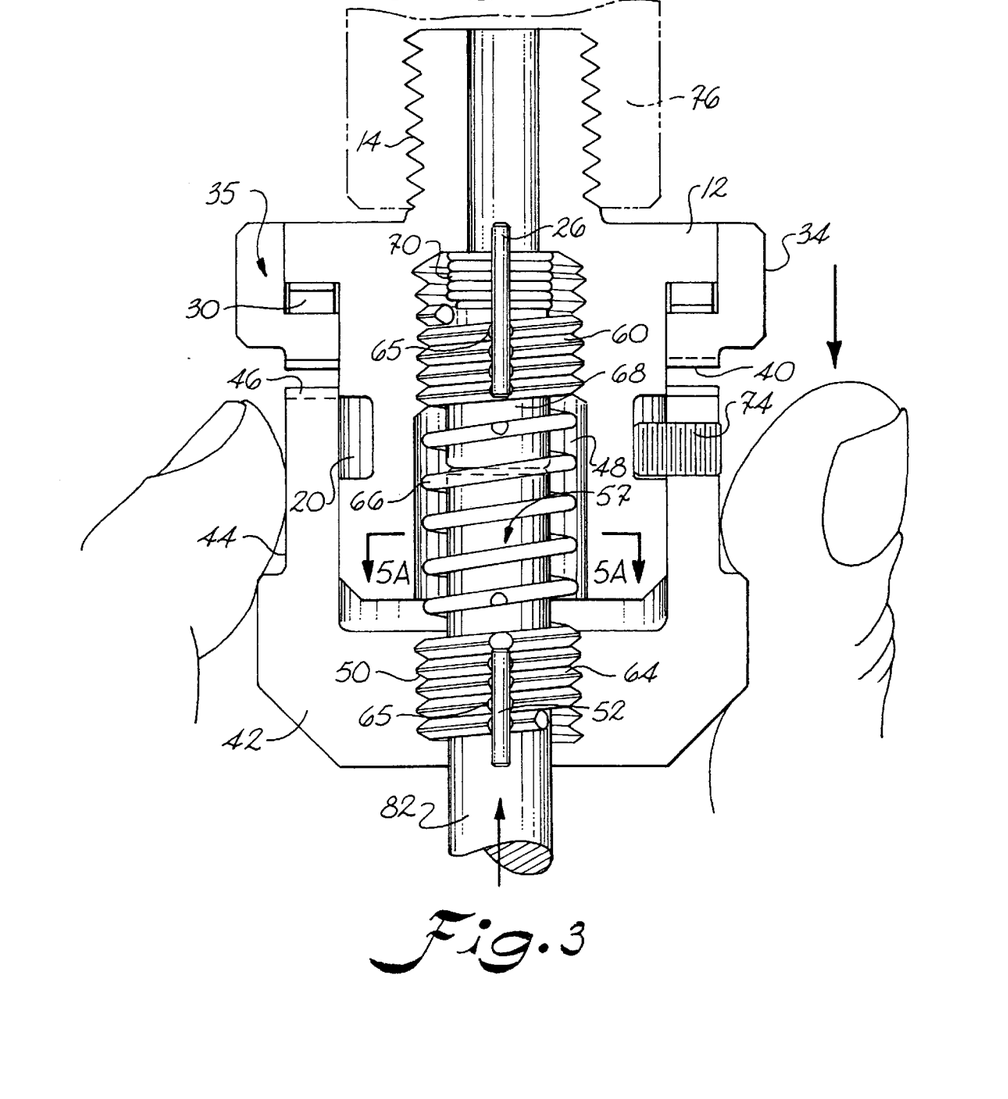
FIG. 3 is an operational cross-cut view of the chuck device particularly illustrating initial insertion of a tool shank therein.

Referring to FIG. 3, upon insertion of a tool shank 82 into the device, blank member 68 is moved axially rearward. Thus, it should be understood that the gripping range of inner diameter bore 57 will always be occupied by either tool shank 82, blank member 68, or a combination of the two. Although not particularly illustrated in the figures, it may be preferred that the entire gripping section defined by coils 66 be occupied by tool shank 82 in an operational mode of the device. Thus, blank 68 could actually extend rearward into the portion of longitudinal recess 22 defined in stem portion 14.

Figure 4:
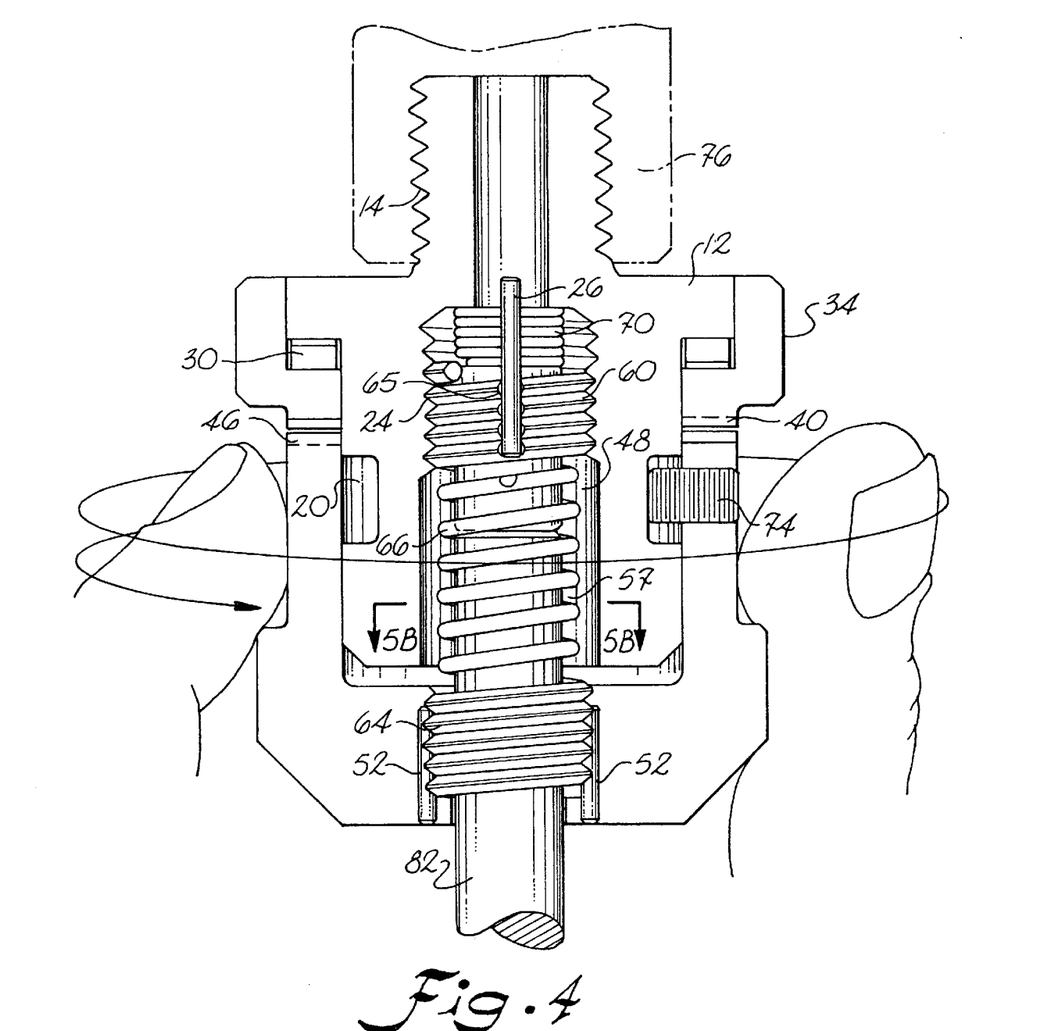
FIG. 4 is another cross-cut operational view particularly illustrating manual rotation of the sleeve member to tighten the coiled member onto the tool shank.
Figure 5A:
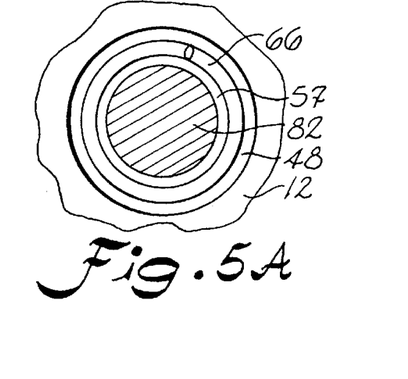
FIGS. 5a and 5b are views taken along the lines indicated in FIG. 4.
Figure 5B:
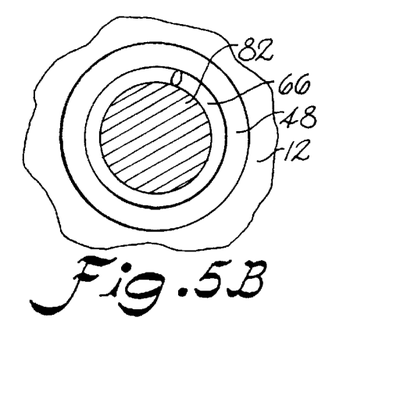

Operational views of the present device are shown in the sequential drawings of FIGS. 3 through 5. FIG. 3 illustrates device 10 upon initial insertion of a tool shank 82 into the device. To tighten the device, sleeve 42 is manually grasped and pulled slightly forward in opposition to the force of coiled member 56 so that the ratchet interface between faces 40 and 46 is separated. This allows for sleeve 42 to then be rotated relative to body member 12, as particularly seen in FIG. 4. The rotating action of sleeve 42 causes coils 66 to tighten or constrict and tightly wrap onto tool shank 82. Once a sufficient number of turns have been imparted to sleeve 42, the operator simply releases sleeve 42 causing the faces 40 and 46 to engage and rotationally lock sleeve 42 relative to collar 34.

It should be understood that, depending on the orientation of the ratchet teeth in faces 46 and 44, that sleeve 42 need not be pulled axially forward to rotate the sleeve relative to collar 34. For example, the ratchet teeth can be oriented so that the teeth on face 46 of sleeve member 42 simply slide over the teeth defined on face 40 yet still rotationally lock sleeve member 42 relative to collar 34. Even with this embodiment, a small degree of axial movement must be allowed for between sleeve 42 and body member 12.

FIGS. 5a and 5b are cross-cut views taken along the lines indicated in FIG. 4. FIG. 5a illustrates the device before tightening or rotation of sleeve 42. FIG. 5a illustrates tool shank 82 within inner diameter groove 57. Coils 66 are not contacting shank 82 and it is relatively easy to insert or remove the shank from the chuck device. FIG. 5b illustrates the device after sleeve 42 has been rotated to tighten coil 66 onto tool shank 82.

In order to release the tool bit from the chuck device, the operator simply grasps collar 4 and pulls the collar axially rearward causing faces 40 and 46 to disengage. Once the ratchet faces have disengaged, sleeve member 42 is free to rotate back to its rest position causing coil 66 to relax and release tool shank 82.

Figure 8:
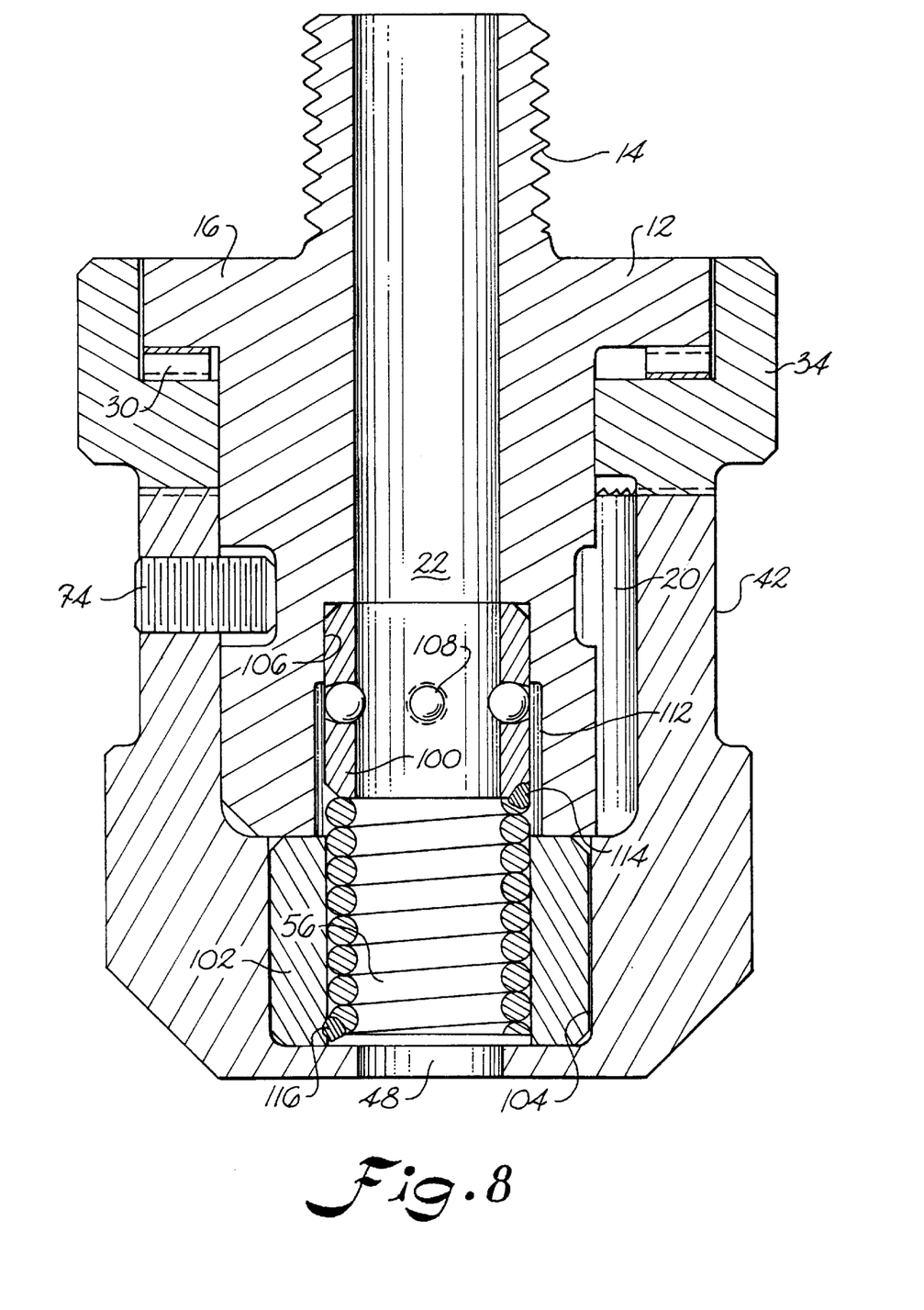
FIG. 8 is a cross-cut view of an alternative embodiment of the chuck device particularly illustrating an alternative coiled member gripping device.
Figure 8A:
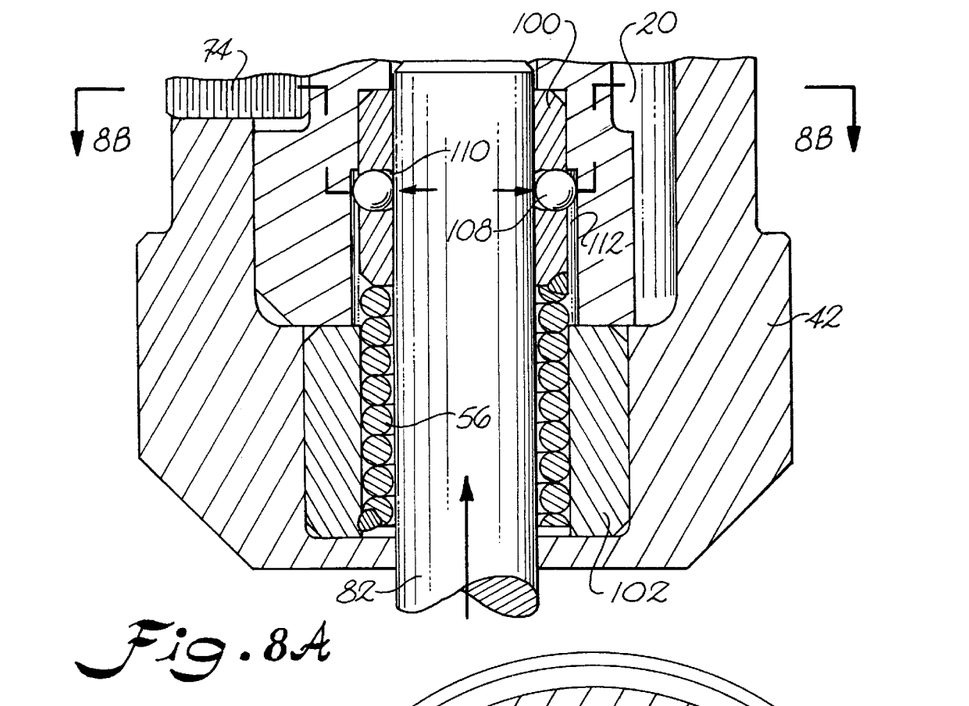
FIG. 8a is an enlarged cross-cut view of the coiled member gripping device.
Figure 8B:
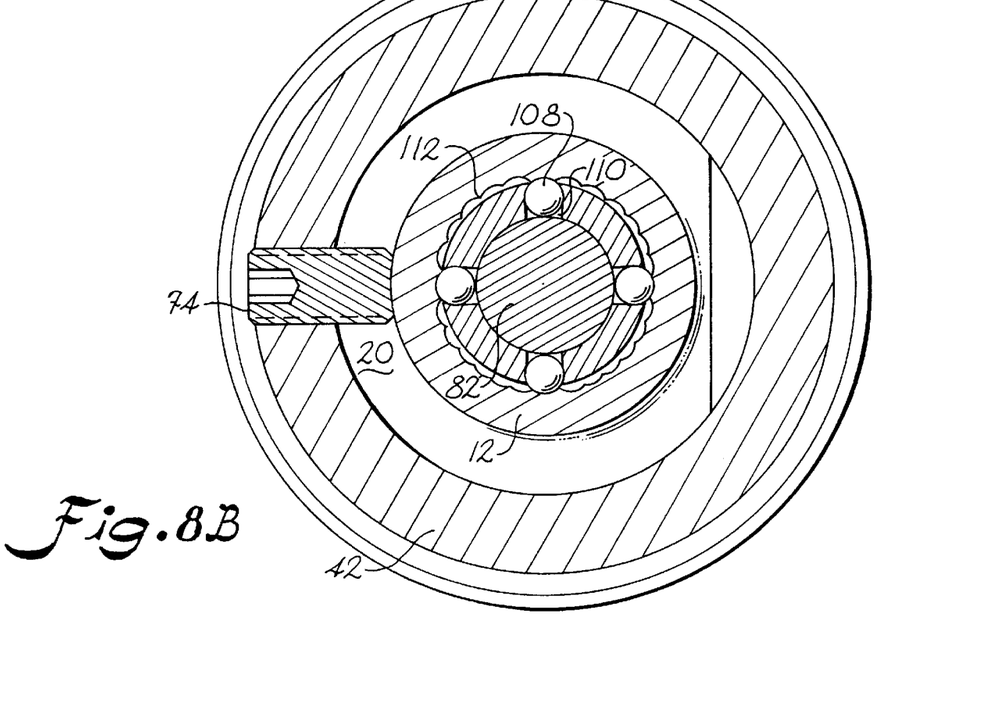
Figure 9:
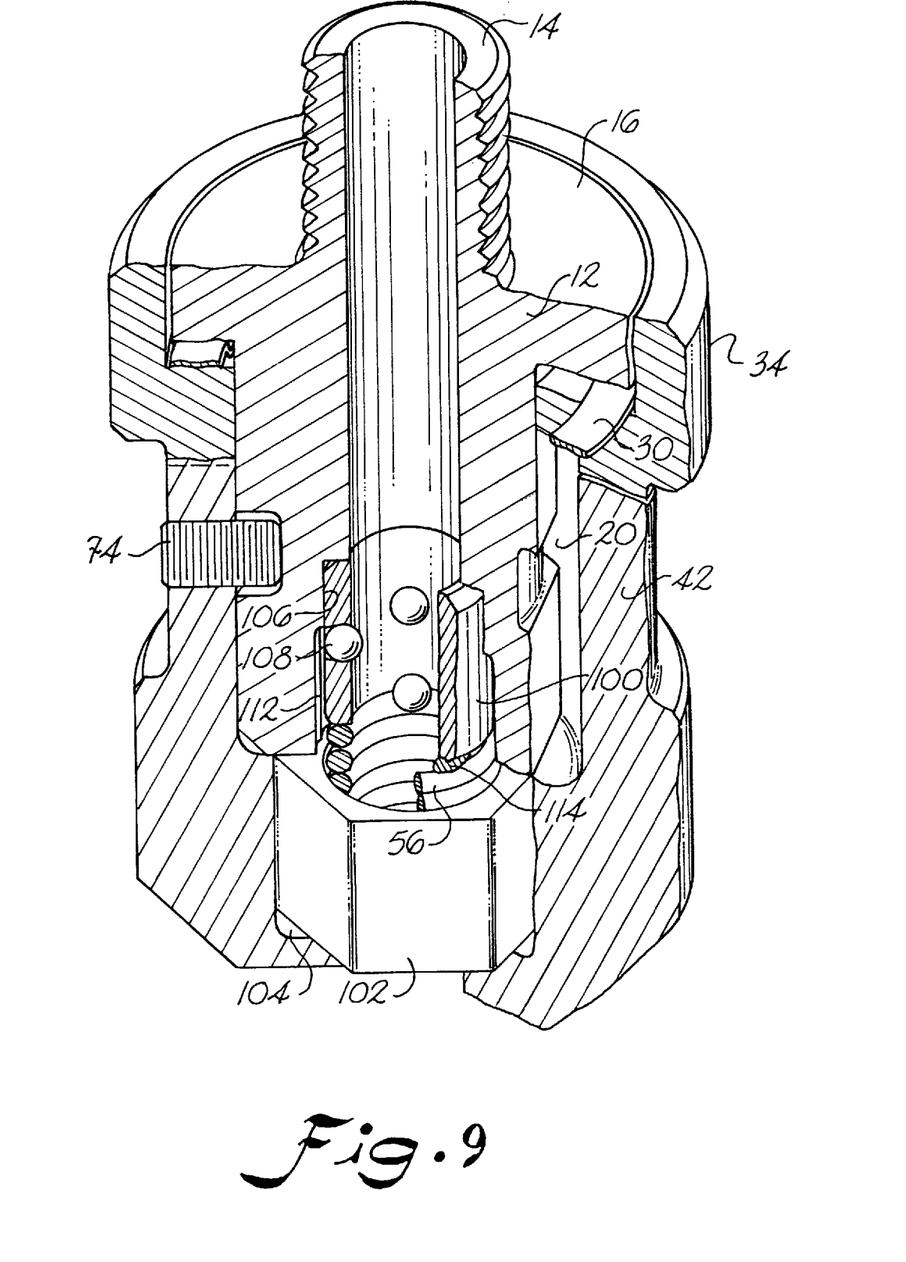
FIG. 9 is a cross-cut perspective view of the device.

An alternative embodiment of device 10 is illustrated in FIGS. 8 and 9. In particular, this embodiment utilizes an alternative configuration of the coiled member gripping device. According to this embodiment, the coiled member gripping device includes a first insert member 102 and a second insert member 100. First insert member 102 is rotationally fixed within a recess 104 defined in sleeve member 42. Referring particularly to FIG. 9, it can be seen that insert 102 is multi sided and corresponds to multi sided recess 104 so as to be rotationally locked within sleeve member 42. Second insert 100 comprises a round profile and resides in a recess 106 defined in body member 12. Insert 100 includes a mechanism for releasably and rotationally locking coiled member 56 within body member 12. In the embodiment illustrated, this releasable locking mechanism includes a plurality of balls 108 housed in holes 110 defined through insert 100. When a tool shank is inserted into the device, such as is shown in FIG. 8a, balls 108 are forced radially outward and engage in splines 112 defined on the inner circumferential surface of recess 106, as can be particularly seen in FIG. 8b.

Coiled member 56 is attached at one respective end to insert 100, for example, by a tack weld 114. At its other end, coiled member 56 is attached to insert 102, for example, by tack weld 116.

In this particularly embodiment, the blank member is not needed to prevent over torquing of the coiled member 56. In a non-operative mode of device 10 wherein a tool shank is not inserted into the device, balls 108 release from splines 112 and sleeve member 42 is thus freely rotatable relative to body member 12. Thus, there is no danger of inadvertently over torquing coiled member 56. Once a tool shank 82 is inserted into the device, balls 108 lock in splines 112 and thus rotationally lock coiled member 56 relative to body member 12. Upon subsequent rotation of sleeve member 42, coiled member 56 constricts and grips upon tool shank 82 along the length of insert 102, as particularly seen in FIG. 8a.

The present invention is suited for any manner of machine tool wherein a tool bit must be rotationally driven. The device is particularly suited for applications wherein relatively great rotational speeds are desired, such as with routers and laminate trimmers. However, this is in no means a limitation of the invention. In fact, it will be apparent to those skilled in the art that various modifications and variations can be made in the apparatus of the present application without departing from the scope or spirit of the present invention. Thus, it is intended that the present invention cover the modifications and variations of this invention, provided they come within the scope of the appended claims and their equivalence.

What is claimed is:

1. A quick release chuck device, comprising:

a body member, and means for attaching said body member to a drive spindle;

a first longitudinal recess defined in said body member;

a sleeve member rotatably mounted on said body member, said sleeve member comprising a longitudinal passage axially aligned with said first longitudinal recess;

a resilient coiled member having a first end non-rotatably attached to said body member in said first recess, and a second end non-rotatably attached to said sleeve member in said longitudinal passage, said coiled member defining an inner diameter bore for receipt of a tool shank therein;

a rotational position releasable locking mechanism operably configured relative to said body member and said sleeve member to releasably lock said sleeve member in a rotated position relative to said body member against an opposing rotational force of said coiled member;

whereby said coiled member constricts and reduces said inner diameter bore and grips upon a tool shank inserted therein as said sleeve member is rotated relative to said body member against said opposing rotational force of said coiled member; and a blank member disposed in said inner diameter bore of said coiled member to prevent overtorquing of said coiled member when a tool shank is not inserted into said bore, said blank member axially movable within said bore upon insertion of a tool shank therein.

2. The device as in claim 1, wherein said means for mounting said body member comprises a threaded connection with said drive spindle.

3. The device as in claim 1, wherein said coiled member comprises a threaded outer circumferential surface at said first and second ends thereof, said threaded surfaces threadedly engaged with corresponding threaded surfaces defined in aid first and second longitudinal recesses.

4. The device as in claim 3, further comprising locking pin members disposed to prevent unthreading of said coiled member from said first an second longitudinal recesses.

5. The device as in claim 1, wherein said rotational position locking mechanism comprises a ratcheting device operably disposed relative to said sleeve member and said body member.

6. The device as in claim 5, wherein said ratcheting device comprises a collar non-rotatably mounted to said body member and axially aligned with said sleeve member, said collar comprising a toothed ratchet face engaging with an opposite toothed ratchet face defined on said sleeve member.

7. The device as in claim 6, wherein said collar is spring loaded in the axial direction towards said sleeve member.

8. The device as in claim 1, wherein said blank member disposed in said inner diameter bore of said coiled member is spring loaded.

9. A quick release chuck device, comprising:

a body member, and means for attaching said body member to a drive spindle;

a first longitudinal recess defined in said body member;

a sleeve member rotatably mounted on said body member, said sleeve member comprising a longitudinal passage axially aligned with said first longitudinal recess;

a resilient coiled member having a first end non-rotatably attached to said body member in said first recess, and a second end non-rotatably attached to said sleeve member in said longitudinal passage, said coiled member defining an inner diameter bore for receipt of a tool shank therein, said coiled member comprising a threaded outer circumferential surface at said first and second ends thereof, said threaded surfaces threadedly engaged with corresponding threaded surfaces defined in aid first and second longitudinal recesses;

a rotational position releasable locking mechanism operably configured relative to said body member and said sleeve member to releasably lock said sleeve member in a rotated position relative to said body member against an opposing rotational force of said coiled member;

locking pin members disposed to prevent unthreading of said coiled member from said first and second longitudinal recesses; and whereby said coiled member constricts and reduces said inner diameter bore and grips upon a tool shank inserted therein as said sleeve member is rotated relative to said body member against said opposing rotational force of said coiled member.

10. A quick release chuck device, comprising:

a body member, and means for attaching said body member to a drive spindle;

a first longitudinal recess defined in said body member;

a sleeve member rotatably mounted on said body member, said sleeve member comprising a longitudinal passage axially aligned with said first longitudinal recess;

a resilient coiled member having a first end non-rotatably attached to said body member in said first recess, and a second end non-rotatably attached to said sleeve member in said longitudinal passage, said coiled member defining an inner diameter bore for receipt of a tool shank therein;

a rotational position releasable locking mechanism operably configured relative to said body member and said sleeve member to releasably lock said sleeve member in a rotated position relative to said body member against an opposing rotational force of said coiled member;

a spring loaded blank member disposed in said inner diameter bore of said coiled member to prevent over torquing of said coiled member when a tool shank is not inserted into said bore, said blank member axially movable within said bore upon insertion of a tool shank therein; and whereby said coiled member constricts and reduces said inner diameter bore and grips upon a tool shank inserted therein as said sleeve member is rotated relative to said body member against said opposing rotational force of said coiled member.

11. A quick release chuck device, comprising:

a body member, and means for attaching said body member to a drive spindle;

a longitudinal recess defined in said body member;

a sleeve member rotatably mounted on said body member; and a resilient coiled member gripping device disposed in said longitudinal recess, said coiled member gripping device defining an inner diameter bore for receipt of a tool shank inserted therein, said coiled member gripping device actuated through rotation of said sleeve member relative to said body member wherein said coiled member constricts causing said inner diameter bore to reduce and grip upon a tool shank inserted therein;

said coiled member gripping device housed within said longitudinal recess defined in said body member and an axially aligned recess defined in said sleeve member, said coiled member gripping device comprising a coiled spring rotationally fixed at respective ends thereof within said recesses in an operational mode of said device when a tool shank is inserted into said device; and wherein said gripping device further comprises an insert member attached to one said respective end of said coiled spring, said insert member non-rotatably housed within said sleeve member recess, and a second insert member non-rotatably engaged within said body member recess in said operational mode.

12. The device as in claim 11, wherein said second insert member is releasably rotationally engaged within said body member recess and is freely rotatable within said body member recess in a non-operational mode of said device when a tool shank is not inserted into said device.

13. The device as in claim 12, wherein said second insert member is releasably engaged within said body member recess with radially movable locking members engaging in splines defined within said body member recess.

* * * * *